US012252314B2

(12) United States Patent
Paauwe et al.

(10) Patent No.: US 12,252,314 B2
(45) Date of Patent: Mar. 18, 2025

(54) CONTAINER AND VALVE FOR A CONTAINER

(71) Applicant: HEINEKEN SUPPLY CHAIN B.V., Amsterdam (NL)

(72) Inventors: Arie Maarten Paauwe, Naaldwijk (NL); Bart Jan Bax, Blaricum (NL); Harold Marcel Blom, Houten (NL)

(73) Assignee: Heineken Supply Chain B.V., Amsterdam (NL)

( * ) Notice: Subject to any disclaimer, the term of this patent is extended or adjusted under 35 U.S.C. 154(b) by 630 days.

(21) Appl. No.: 17/106,274

(22) Filed: Nov. 30, 2020

(65) Prior Publication Data

US 2021/0086966 A1 Mar. 25, 2021

Related U.S. Application Data

(63) Continuation of application No. 14/426,663, filed as application No. PCT/NL2013/050770 on Oct. 30, 2013, now Pat. No. 10,882,671.

(30) Foreign Application Priority Data

Oct. 30, 2012 (NL) ...................................... 2009731

(51) Int. Cl.
*B65D 51/16* (2006.01)
*B65B 7/28* (2006.01)
(Continued)

(52) U.S. Cl.
CPC ........ *B65D 51/1661* (2013.01); *B65B 7/2807* (2013.01); *B65D 1/02* (2013.01);
(Continued)

(58) Field of Classification Search
CPC .. B65D 51/1661; B67D 1/272; B67D 1/0831; B67D 1/0845; B67D 1/0835; B65B 7/28; A47G 19/2205
(Continued)

(56) References Cited

U.S. PATENT DOCUMENTS 4,834,266 A * 5/1989 Brewer ................ B67D 1/0832 137/212
5,046,645 A 9/1991 Hagan et al.
(Continued)

FOREIGN PATENT DOCUMENTS

DE 1034053 B 7/1958
EP 0013565 A1 7/1980
(Continued)

OTHER PUBLICATIONS

Papara, M., et al., "Container Effects on the Free Drainage of Wet Foams", Chemical Engineer Science, vol. 64, 2009, pp. 1404-1415.
(Continued)

*Primary Examiner* — Ernesto A Grano
(74) *Attorney, Agent, or Firm* — Banner & Witcoff, Ltd.

(57) ABSTRACT

Valve, comprising a base element and a snap ring or snap fingers extending there from, positioned around an opening through the base element, wherein within the snap ring or between the snap fingers a valve housing is provided, having at least one inlet opening and a spring loaded valve body, biased towards the base element and closing off the opening, wherein the valve body is operable through the opening for opening a fluid connection between the inlet opening or openings and the opening in the base element.

15 Claims, 14 Drawing Sheets

(51) Int. Cl.
*B65D 1/02* (2006.01)
*B67D 1/04* (2006.01)
*B67D 1/08* (2006.01)

(52) U.S. Cl.
CPC ......... *B67D 1/0462* (2013.01); *B67D 1/0835* (2013.01); *B67D 1/0845* (2013.01)

(58) Field of Classification Search
USPC ............................................................ 215/40
See application file for complete search history.

(56) References Cited

U.S. PATENT DOCUMENTS

| | | | | |
|---|---|---|---|---|
| 5,431,205 | A | 7/1995 | Gebhard | |
| 5,445,186 | A | 8/1995 | Richter et al. | |
| 5,862,948 | A | 1/1999 | Duchon et al. | |
| 5,941,407 | A | 8/1999 | De'Longhi | |
| 5,954,240 | A | 9/1999 | Duchon et al. | |
| 5,975,489 | A | 11/1999 | DeCler et al. | |
| 6,129,125 | A | 10/2000 | Duchon et al. | |
| 6,202,901 | B1 | 3/2001 | Gerber et al. | |
| 6,367,660 | B1 | 4/2002 | Chang | |
| 6,367,667 | B1 * | 4/2002 | Ipsen | B67D 1/0832 222/509 |
| 6,375,048 | B1 | 4/2002 | Van Der Meer et al. | |
| 6,516,839 | B1 * | 2/2003 | Timp | B67D 1/0832 141/2 |
| RE38,328 | E | 11/2003 | Gueret | |
| 6,745,922 | B1 * | 6/2004 | Vlooswijk | B65D 83/663 222/394 |
| 7,353,965 | B2 | 4/2008 | Reutter | |
| 8,136,703 | B2 | 3/2012 | Kamishita | |
| 8,579,158 | B2 * | 11/2013 | Rice | B65D 83/62 222/105 |
| 8,684,026 | B2 | 4/2014 | Rundin | |
| 8,771,711 | B2 | 7/2014 | Kamishita | |
| 8,851,340 | B2 * | 10/2014 | Kreyenberg | B67D 1/0418 137/212 |
| 8,899,445 | B2 | 12/2014 | Rasmussen | |
| 8,906,438 | B2 | 12/2014 | Landman et al. | |
| 8,935,905 | B2 * | 1/2015 | Monzel | B65B 7/2821 53/485 |
| 8,950,636 | B2 | 2/2015 | Landman et al. | |
| 9,114,971 | B2 | 8/2015 | Rasmussen et al. | |
| 9,327,462 | B2 | 5/2016 | Nicholson et al. | |
| 2003/0006393 | A1 * | 1/2003 | Hullegien | F16L 37/32 251/149.6 |
| 2004/0050879 | A1 * | 3/2004 | Vlooswijk | B67D 1/0456 222/402.1 |
| 2004/0226967 | A1 * | 11/2004 | Van Der Klaauw | B67D 1/1422 222/146.6 |
| 2009/0014679 | A1 * | 1/2009 | Hygema | B65D 83/42 251/368 |
| 2009/0275668 | A1 | 11/2009 | Kamishita | |
| 2009/0289083 | A1 | 11/2009 | Kamishita | |
| 2010/0155432 | A1 * | 6/2010 | Christianson | B65D 83/262 222/402.1 |
| 2010/0176149 | A1 | 7/2010 | Rasmussen | |
| 2011/0036807 | A1 | 2/2011 | Landman | |
| 2011/0038989 | A1 | 2/2011 | Landman | |
| 2011/0210141 | A1 | 9/2011 | Maas et al. | |
| 2012/0043352 | A1 | 2/2012 | Rasmussen et al. | |
| 2012/0058230 | A1 | 3/2012 | Rasmussen | |
| 2012/0100266 | A1 | 4/2012 | Nicholson et al. | |
| 2012/0132607 | A1 | 5/2012 | Landman et al. | |
| 2012/0138161 | A1 | 6/2012 | Wolthers | |
| 2013/0092689 | A1 | 4/2013 | Rundin | |
| 2014/0117592 | A1 | 5/2014 | Nicholson et al. | |
| 2015/0108080 | A1 * | 4/2015 | Grittmann | B65D 45/32 215/359 |
| 2015/0282651 | A1 | 10/2015 | Paauwe et al. | |
| 2015/0321895 | A1 | 11/2015 | Rasmussen et al. | |
| 2016/0207695 | A1 | 7/2016 | Nicholson et al. | |
| 2020/0180854 | A1 * | 6/2020 | Christiansen | B65D 51/1633 |

FOREIGN PATENT DOCUMENTS

| | | | |
|---|---|---|---|
| EP | 0056295 | A1 | 7/1982 |
| EP | 2030944 | A2 | 3/2009 |
| EP | 2282947 | A2 | 2/2011 |
| EP | 2291321 | A1 | 3/2011 |
| EP | 2448735 | A2 | 5/2012 |
| EP | 2448858 | A1 | 5/2012 |
| EP | 2917148 | B1 | 9/2015 |
| GB | 2283967 | A | 5/1995 |
| GB | 2479467 | A | 10/2011 |
| NL | 1006950 | C | 3/1999 |
| NL | 2009235 | C | 1/2014 |
| NL | 2009237 | C | 1/2014 |
| NL | 2009234 | C | 8/2014 |
| NL | 2009236 | | 8/2014 |
| WO | 9521101 | | 8/1995 |
| WO | 9726210 | A2 | 7/1997 |
| WO | 2005012158 | A1 | 2/2005 |
| WO | 2007019853 | A2 | 2/2007 |
| WO | 2007123207 | | 11/2007 |
| WO | 2009126034 | A1 | 10/2009 |
| WO | 2010014004 | A2 | 2/2010 |
| WO | 2010119056 | | 10/2010 |
| WO | 2011002295 | A1 | 1/2011 |
| WO | 2012054203 | A1 | 4/2012 |

OTHER PUBLICATIONS

Bamforth, C., "Beer—A Quality Perspective", Handbook of Alcoholic Beverages Series, ISBN 9780080926094, May 2011, pp. 46-48.

* cited by examiner

CONTAINER AND VALVE FOR A CONTAINER

CROSS REFERENCE TO RELATED APPLICATIONS

This application claims priority to U.S. patent application Ser. No. 14/426,663 filed Mar. 6, 2015, the contents of which are incorporated herein by reference.

FIELD OF THE INVENTION

The invention relates to a container. The invention especially relates to a container for gas containing beverages, especially carbonated beverage such as beer.

BACKGROUND OF THE INVENTION

Containers, such as beverage containers filled with a gas containing beverage, especially a carbonated beverage such as beer, wort based drinks, Ciders Radlers and soft drinks, are well known in the art and can be made of different materials, such as metal or plastic or combinations thereof. Containers can be placed with a dispense valve at an upper end thereof, for dispensing the content. In other embodiments such containers can be placed with a dispense valve at an end of the container facing to a side or at an end facing downward.

Traditionally containers such as kegs were used, in which the content is pressurized inside the container by supplying pressurized gas, especially carbon dioxide gas, into the compartment of the container containing the content, such as a beverage.

Alternatively, pressurizing means can be provided inside the container, such as for example disclosed in EP 2291321 and EP2282947.

The gas pressurizes the content, forcing it out through a valve, for dispensing, at the same time filling the volume of the compartment from which the content is dispensed. When the dispense valve is provided at the upper end of the container, a riser pipe can be provided, connected to the valve for feeding the content from near the bottom of the container to the valve. When the valve opens to a side of the container similarly such riser pipe can be provided.

More recently containers are used which are compressed for expelling the content, such as beverage. In such systems the content can be enclosed within a partly or fully flexible container, such as a bag or thin walled container, which can be compressed in a suitable way, reducing the volume of the compartment within the container comprising the content to be dispensed, such as but not limited to beverage. Thus the content is pressurized and can be expelled through a valve. The container can for example be an integral container, as is for example known from EP 2448858 or WO2007/019853 or can for example be an inner container of a BIC (Bag-in-Container) or BIB (Bag-in-Box or Bag-in-Bottle or Bottle-in-Bottle) type container. In the latter case a pressurizing fluidum, such as a gas for example air can be inserted into a space between the inner and outer container of the BIC or BIB, compressing the inner container from outside and/or from within the BIC or BIB type containers. In these compressible containers again a riser pipe can be used, connecting to the valve, but in most cases it is or would be preferable to do without such riser pipe, because it is cumbersome, costly and ineffective, especially since it may increase the risk that a volume of content will be trapped within the container, between the container wall and the riser pipe, when for example access of content to the riser pipe becomes blocked by the container wall. Additionally by such riser pipe the risk in increased that the riser pipe may become blocked by the container, especially the inner container when compressed, or the riser pipe may even pierce the container when compressed, resulting in leaking and mixing of the content with the pressurizing fluidum. Alternatively or additionally containers are known comprising a pressurizing device in or on the container, which pressurizes the beverage either by introducing gas at high pressure into the beverage compartment from a gas cartridge of the pressurizing device or into a space between an inner and outer container. Or by evaporation of medium like used within aerosol containers, or CO2 released by bonding on active coal, such as for example disclosed in EP 2291321 or EP 2282947.

In most of these known containers use is made of valves or valve assemblies which are mounted to the neck of the container. For example valves such as but not limited to aerosol valves are used, clinched to the neck or an edge of an opening in the neck or a wall of the container by a metal plate. Clinching is a production method requiring special tools and special skills and accuracy, especially with pressurized contents of a container. Use of a clinching device in a filling line for containers is complex, cumbersome and in general undesirable.

BRIEF SUMMARY OF THE INVENTION

An aim of the invention is to provide an alternative container, having a valve, especially but not necessarily a beverage valve, provided for example at an end of the container, preferably free of a riser pipe connecting to the valve. An aim of the present invention is to provide for an alternative container comprising a gaseous content, such as but not limited to a beverage, especially a carbonated beverage, which is compressible for dispensing the content through a valve provided in the container, especially a beverage container which has no riser pipe connected to the valve. The container can be a self contained container or part of a BIC or BIB type container. The container can also be a gas containing container, or regular container as used in aerosol industry filled or to be filled with for example a liquid, gas, paste, mixture of liquid and gas or any other suitable content.

An aim of the present invention is to provide for an alternative valve and valve assembly for closure of a container, especially a beverage container. An aim of the present invention is to provide for a valve and valve assembly which enables easy closure of the container, and especially easy mounting of the valve, even in line on a filling line or filling station, for example in a wet environment.

Another aim of the present invention is to provide for a valve especially a beverage valve, for a container. Preferably such valve is provided without a riser. Moreover an aim is to provide for a valve assembly for a container, especially for a beverage container.

An aim of the present invention is to provide for a beverage container and a valve or valve assembly for such container, which prevents excess foaming of the beverage when dispensing. An aim of the present invention is to provide for a container or valve or valve assembly therefore which is easy to manufacture and is relatively inexpensive and/or is easily and conveniently recyclable with the container.

At least one or some of these and other aims and objects of the invention may be obtained by a container and/or valve and/or valve assembly as disclosed in this document.

BRIEF DESCRIPTION OF THE DRAWINGS

Embodiments of a container, a valve and a valve assembly of this disclosure will be discussed hereafter, with reference to the drawings, which are only given by way of example and should by no means be understood as limiting the scope of the disclosure or protection in any way or form. These examples are given in order to better understand the invention and are not restrictive. In these drawings.

DETAILED DESCRIPTION OF EMBODIMENTS OF THE INVENTION

Figure 1:
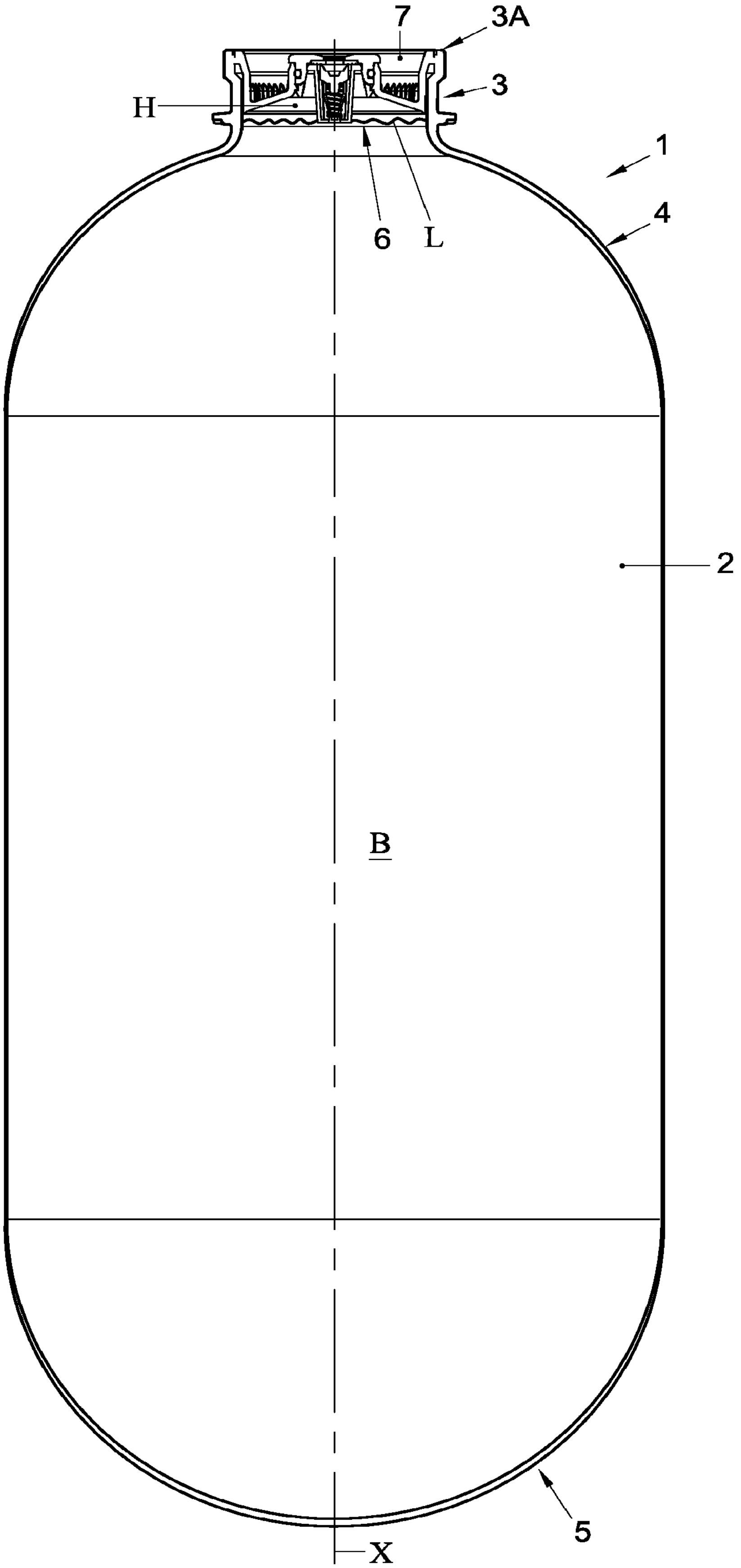
FIG. 1 schematically the general configuration of an embodiment of a container having a body and a neck.

In this description the same or similar elements or features will have the same or similar reference signs. The embodiments shown are by way of example only and should by no means be understood as limiting the scope of the invention in any way. The disclosure is not limited to the embodiments shown. Many alternatives are possible, including but not limited to combinations and permutations of elements and features of the embodiments according to the disclosure in the drawings. Unless otherwise defined all cross sections are shown as taken in a plane comprising a longitudinal axis X, which plane can be a plane of symmetry of the valve, valve assembly and/or container.

In tapping devices, especially for gaseous beverages such as carbonated beverages foaming of the beverage when being dispensed can be an important issue to be controlled. For example when dispensing beer, such as lager or pilsner type beers, from a container it is important that the beer is dispensed into a glass or the like with enough but not excessive foaming. Foaming is at least in part the result of gas bubbles in the beverage, especially carbon dioxide gas bubbles, with an appropriate size distribution.

Consumers tend to place a lot of importance on beer heads. Too much of a head may be undesirable because it detracts from the mass of the drink whereas a glass of beer is viewed as incomplete unless it has a head, and the specific form of head expected for the type of beer. Beer heads may be considered as important for the aroma of the beer and/or for the aesthetic look of the beer. In order to obtain a proper head or at least proper foaming of the beverage many features have been applied to different tapping devices and containers, in order to influence features that could influence tapping behavior of the beverage and/or the tapping apparatus. For example different tapping pressures, different cross sections of tapping lines, dispense heads and/or tapping cocks, foaming or anti-foaming provisions in the tapping line, tapping head and/or tapping cocks are used, for regulating the foaming. All of these provisions are provided either in the pressure regulation side of a tapping apparatus or in the tapping device, between the keg and the outlet side of the tapping cock.

Though many of these features have been successful in improving tapping behavior, there is still a need for improvement. Especially in tapping devices comprising a container filled with a gaseous beverage such as beer, having a head space within the container. Such containers can be without a riser pipe connecting a beverage valve above the head space with the beverage below the head space. It has shown that especially in such devices there can still be problems in tapping behavior, especially directly after broaching the container.

A head space of a beverage container is the space above a surface level of the beverage within a container, which space will normally be filled with gas, especially gas which is present in the beverage, such as carbon dioxide gas or a gas mixture comprising carbon dioxide gas for a carbonated beverage.

This description discloses containers, especially beverage container, comprising a body and a neck, wherein at the neck a valve is provided for dispensing the content of the container, such as for example but not limited to a beverage, especially a beverage comprising gas or for dispensing gas or other contents such as paste, non carbonated beverages etcetera.

An inner surface part of the container, especially an inner surface part of the container within the neck between the body and an inlet side of the valve can be smooth and sloping towards the inlet side of the valve. The said surface part can be smooth and sloping, such that foam is prevented from being trapped at the inner surface of the neck.

It has been found surprisingly that the design of the container itself can have a significant impact on the forming of foam, especially excess foaming when dispensing the beverage, especially directly after broaching the container. It has been found that the forming and trapping of foam, formed by bubbles in the container, at an inner surface thereof, can be one of the reasons such foaming can become a problem. Similarly trapping of foam can be a problem in other contents, such as chemicals Trapping of foam should be understood as foam or bubbles being prevented from traveling along an inner surface part of the container to a beverage valve or such closure of the container. It has been found that foam can be trapped for example by grooves or crevices, behind notches or ridges or the like, or at surface areas which are for example substantially horizontal when the container is positioned in a normal working positing for dispensing the beverage, which would be substantially parallel to the surface level of the beverage. It has been found surprisingly that such foam being trapped at one or more of these surface areas can significantly negatively influence the tapping behavior of a tapping device with which the container is used or of which the container is a part.

In this application with respect to said inner surface part of the container smooth surface has to be understood as at least a surface part free of for example ridges or grooves, or irregularities in general, such that foam can be trapped behind such ridges or in such grooves or crevices or in and/or behind such irregularities. In this disclosure foam has to be understood as at least meaning a frothy substance formed by gas bubbles, especially but not exclusively by gas bubbles having different diameters, especially but not necessarily containing at least gas bubbles having a diameter of at least 50 microns which may occur especially in carbonated beverages.

Beverage containers containing gaseous beverages such as carbonated beverage, especially beer, in a filling line or filling station of a brewery or fillery are filled as far as possible with beverage, to make optimal use of the volume of the container and/or in order to leave a limited head space. The head space is filled with gas. During filling the container may be filled with beverage up to about the rim, after which the beverage is made to foam slightly, driving all air out of the container just before it is closed. Then the foam will settle gain, such that the gas filled head space will be obtained, above the beverage and directly below a closure, such as a beverage valve. A clear surface of the beverage will then form the transition of the beverage to the gas. The pressure in the container will depend inter alia on the temperature of the beverage, the pressure around the container and the equilibrium pressure for the gas in the beverage, as well as the size of the head space and the container. Said pressure in the head space will be above atmospheric pressure and can for example be between 1 and 3 Bar above atmospheric or between 2 and 4 Bar absolute.

When broaching the container, that is when opening the container by opening beverage valve or the like, especially for the first time and/or when opening the container when there is a head space in the container, the pressure in the head space will be reduced suddenly and very quickly. This will result in gas being released from the beverage, forming bubbles and thus foam filling the head space. When dispensing beverage from the container following such forming of foam without a riser pipe connected to the valve through which a beverage is dispensed, foam from the head space should be dispensed with the first portion of beverage. Preferably when dispensing the beverage from the container after said first portion foaming of the beverage will only occur in a glass or pitcher or the like after dispensing, such that the foaming can be properly controlled.

When using a container without a riser pipe and having a beverage valve at an upper end of a head space for dispensing the beverage it has been found that even after dispensing the first portion of the beverage after broaching there can be uncontrolled foaming when dispensing beverage from the container. It can happen that almost only foam is dispensed from the container or that at least over a period of time, which can last the entire time beverage is dispensed, excessive foaming occurs, such that foam heads on consecutive glasses dispensed may be irregular and not within a desired specification. Surprisingly it has been found that this can at least in part be the result of foam formed in the head space when broaching the container left behind in the container and being released into the beverage being dispensed uncontrolled. Without wanting to be bound to any theory or explanation this appears to have the effect that the foam or bubbles therein forming the foam released into the beverage being dispensed acts as a nucleus for forming further bubbles and thus forming further foam. The foam will fill substantially the entire cross section of a dispense line connected to the beverage valve, and will result in said dispensing of excessive foam into or example a glass or pitcher.

In other words it has been found that the foam formed in the head space directly after broaching is not all, or at least not always all, dispensed sufficiently with the first amount of beverage dispensed after said broaching. Since it will take relatively long for gas to be reabsorbed into the beverage and thus for foam to disappear in the headspace, such foam will remain inside the container long, if not dispensed with the beverage. This means that as long as beverage is dispensed from the container such remaining foam may be released into the stream of beverage to be dispensed and thus result in said uncontrolled foaming in the dispense line and/or glass or pitcher.

It has been found that the shape of the inner surface of the container in and around the area of the head space is mainly influencing the foam remaining in the container when dispensing beverage. Without wanting to be bound to any theory or explanation it appears that when dispensing beverage from prior art containers having a head space and no riser pipe connected to a beverage valve at the top side of the headspace, foam is trapped in the head space and the beverage is at least partly dispensed through the foam, leaving some of the foam, especially a ring shaped amount of foam in an area of the container, against an inner surface thereof, especially an area around the valve.

Containers are known to be closed by a valve or valve assembly which can be clinched by a metal plate to a neck or rim of an opening. To this end for example a filling line has to be equipped with a clinching apparatus, which is costly and can be prone to problems. The clinching has to be done very securely in order to obtain and maintain a proper closure of the container, even if a content such as a beverage or gas to be contained therein has a relatively high pressure. It would be preferable if a valve or valve assembly could be provided in an alternative way, especially a simpler way. When dispensing certain types of content, such as fluida such as liquid or gas, especially non carbonated beverages, beverage or gas, and/or when the valve is at an end of the containers spaced apart from a head space or when there is no such headspace, the foaming issue as described here above may not exist or may not be a problem.

FIG. 1 shows a the general format of a container 1, comprising a body 2, a neck 3 and a transition part or shoulder 4 connecting the neck 3 to the body 2. The neck 3 and the body 2 are substantially cylindrical with a coinciding longitudinal axis X. At the end opposite the neck 3 the body 2 is closed by a bottom 5. The bottom 5 can be a stand portion, such as for example a petaloid type bottom 5, or can be have a different configuration, such as for example shown in FIG. 1, semi spherical or dome shaped, in which case for example external means can be fitted or provided for standing the container on the bottom. In FIG. 1 the container 1 is filled with beverage, especially carbonated beverage and more specifically beer, which has an upper surface L, below a rim 3A of the neck 3, defining a head space H. When filled with a gas, for example CO2 gas, there will be no such head space H.

Figure 14:
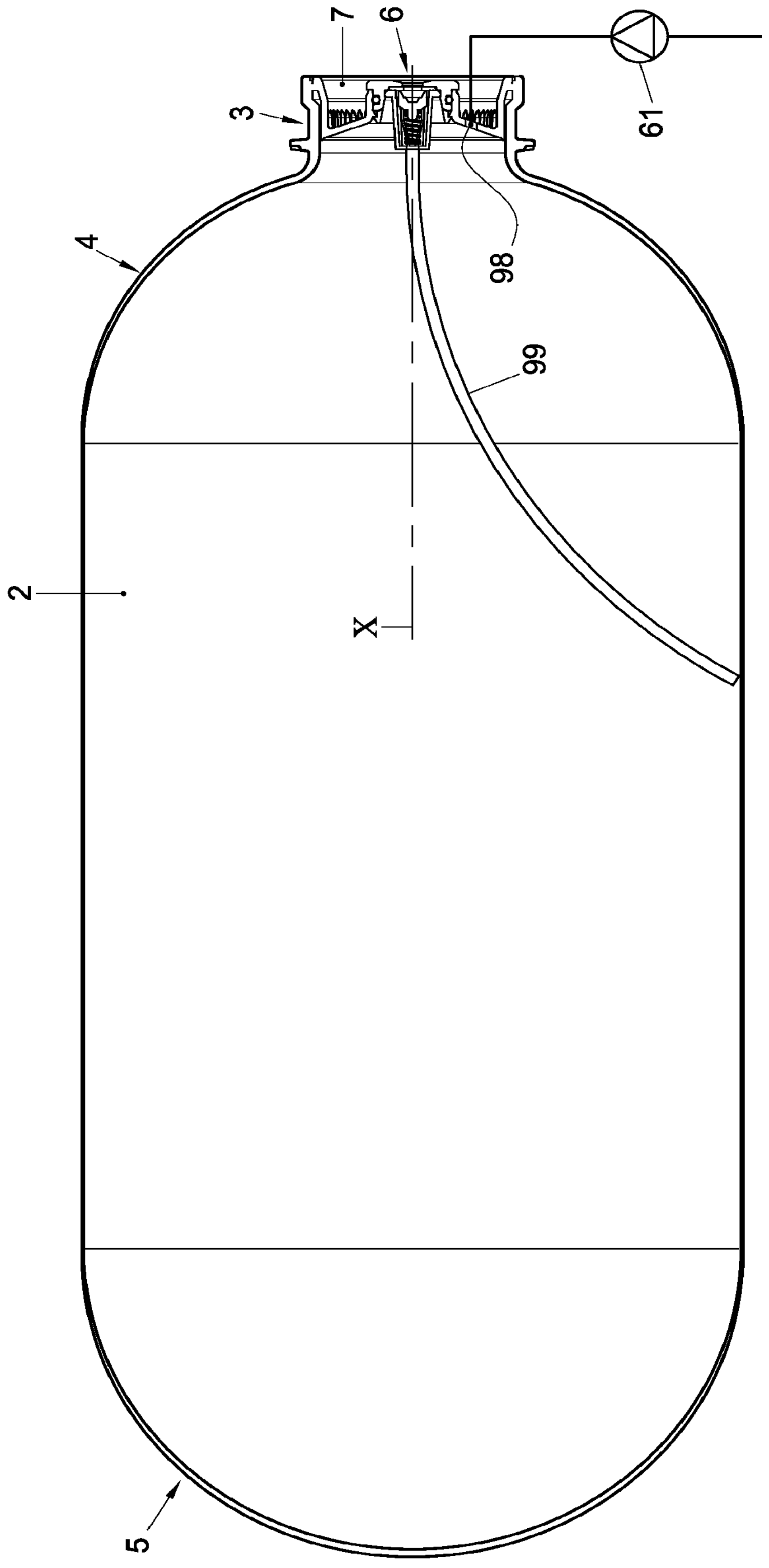
FIG. 14 schematically a container having an axis X extending substantially horizontal when tapping, wherein a riser pipe is connected to the valve in a known manner, by way of example.

When such container is placed differently for example with the axis X tilted relative to a vertical, such that the valve 6 is not at the top end but for example to a side, as shown in FIG. 14, or when the valve is at a bottom end, the valve will be spaced apart from such head space.

Figure 2:
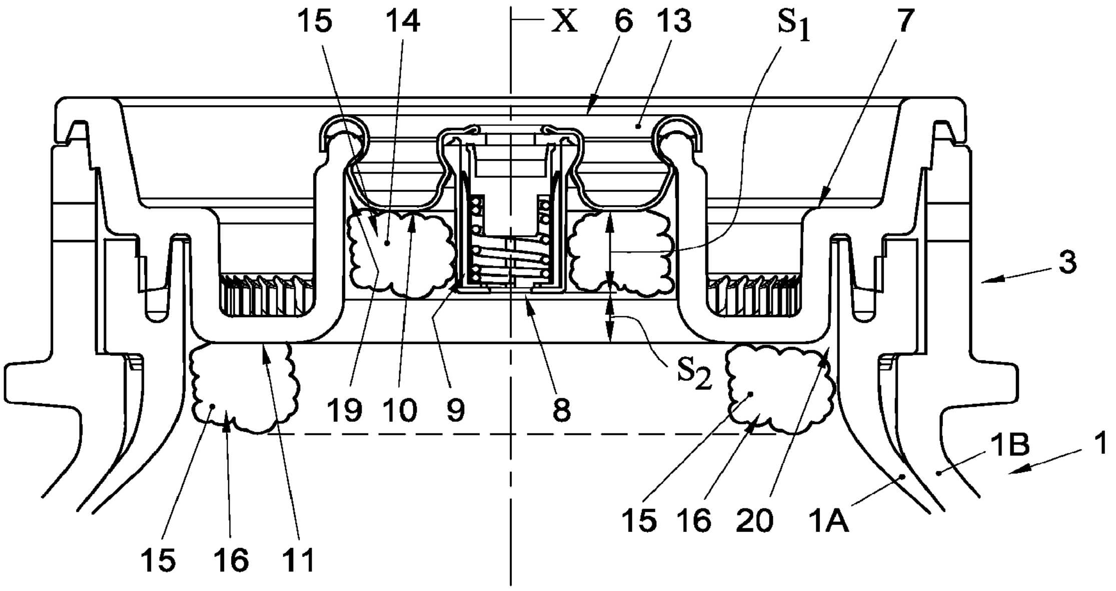
FIG. 2 schematically in cross section part of a container as shown in FIG. 1A according to the prior art.

In the prior art container 1 as shown especially in FIG. 2 by way of example, a valve 6, especially an aerosol type valve, is clinched by clinch plate 13 to a mounting ring 7, which in turn is mounted to the neck 3, closing the container 1. The valve 6 has an inlet side 8 formed by one or more inlet openings 9, spaced apart over an axial distance S1 below an inner surface 10 of the clinch plate 13. This inner surface 10 is substantially flat and extends substantially perpendicular to the axis X. Moreover the mounting ring 7 comprises a further ring shaped surface 11 space axially apart over a distance S2 below the inlet side of the valve 6. The container is standing on the bottom 5, such that the valve 6 is at the top of the container 1, above the head space before broaching the container 1. In this application references like up and down, top and bottom and the like will be used with reference to such position of a container 1, with a valve at a top end and a bottom at a lower end. The mounting ring 7 can partly close off the neck opening and therefore can thus also be considered forming a closure ring 7.

As can be seen in FIG. 2 at the side of the clinch plate 13 facing the inner volume of the container 1 between the plate 13 and the ring 7 a groove 19 is provided, due to the clinching process. Moreover a relatively wide groove 20 is formed between the container and the mounting ring 7.

In FIG. 2 an upper part of the container 1 according to the prior art is shown after dispensing a first amount of beverage 12 from the container after broaching. FIG. 2 shows a first amount 14 of foam 15, trapped below the surface 10 of the clinch plate 13, above the inlet openings 9 of the valve 6 and in the groove 19. FIG. 2 further shows a second amount 16 of foam 15 trapped below the surface 11 of the mounting ring 7 and in the wide groove 20. Beverage has been dispensed through a center area 17 directly below the valve 6, leaving the first and second amounts 14, 16 of foam 15. During further dispensing these amounts of foam 15 or parts thereof may be released uncontrolled and at any given moment.

In the embodiments of FIGS. 3-13 reference is made to embodiments of containers and valves and if applicable valve assemblies, comprising a mounting ring and a valve, for dispensing contents having possible foaming as discussed, such as beverages, especially carbonated or otherwise gassed beverages such as beer. To this end the inner surface part 18 is extensively discussed for preventing trapping of foam. However, if the container is used for other contents which will not lead to excessive foaming or for which such foaming is no problem, the inner surface may be formed differently. In a valve or valve assembly of the present invention an interesting feature can be that it can be snapped into place, obviating the need for clinching. Another interesting aspect of a valve or valve assembly according to the disclosure can be that the valve housing can be snapped into the base element, enclosing the spring and valve body and sealing ring, if applicable. This makes manufacturing a lot easier. Materials can be used that can be easily recycled, especially together with the material of the container.

Figure 3:
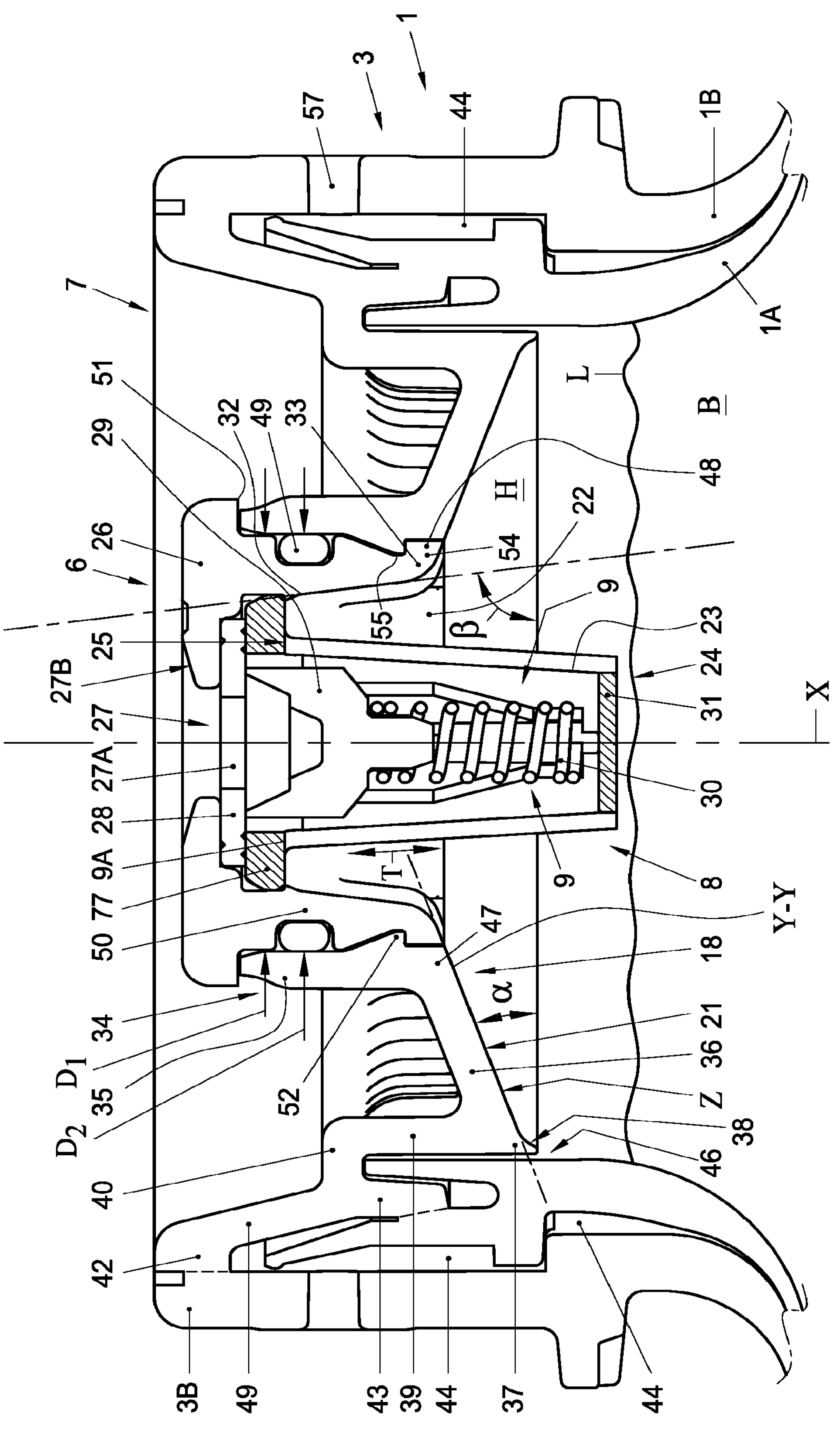
FIG. 3 schematically in cross section similar to FIG. 1 an embodiment of a part of a container according to the present invention, having an embodiment of a valve and valve assembly of the present disclosure.

FIG. 3 shows an upper part of an embodiment of a container 1 according to the present invention, in cross section. In this embodiment the container 1 has an inner surface area 18 adjacent the inlet side 8 of the valve 6. The surface area 18 forms an inner surface part of the container extending around an inner part of the container 1 occupied by the head space H before broaching (FIG. 1). Said inner surface area 18 will extend at least along or include the inner surface 21 of the mounting ring 7 and can also include part of the surface formed by the transition 46 between the neck 3 and the body 2. Moreover the surface area 18 can include a surface area 22 of the valve 6. As can be seen in FIG. 3 the inner surface part 18 is smooth and sloping, more specifically sloping constantly towards the valve 6. The valve 6 has an inlet side 8 formed by at least one opening 9 and is not connected to a riser pipe extending into the beverage B. The or each opening has an upper edge 9A opposite the side of the bottom 5 of the container 1. The surface area 18 extends sloping towards the inlet side of the valve 6 such that it is substantially flush with the said upper edge 9A.

Figure 7:
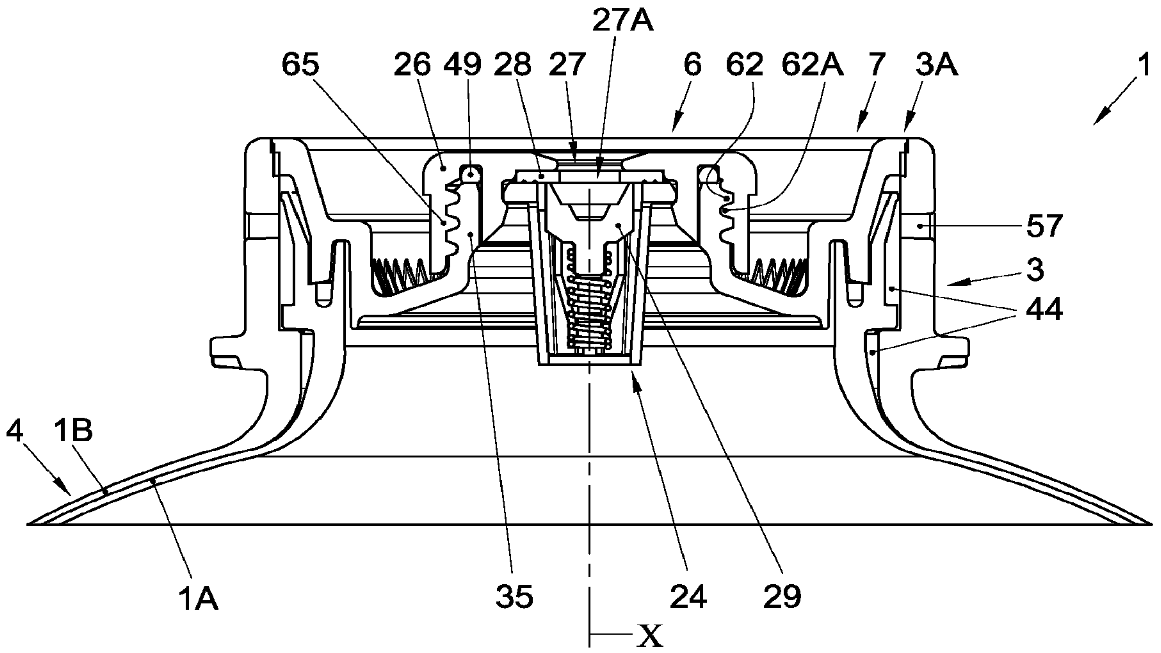
FIG. 7 schematically in cross section similar to FIG. 1 an alternative embodiment of part of a container according to the present invention, having an embodiment of a valve and valve assembly of the present disclosure.

In the embodiment shown in FIG. 3 the valve 6 comprises a peripheral wall portion 23 forming a valve housing 24. The peripheral wall portion 23 comprises at least one and for example two openings 9, at diametrically opposite sides or for example four openings 9 as shown in FIGS. 7 and 9, forming the inlet side of the valve 6. The openings 9 are in the embodiments shown as substantially rectangular, having a longitudinal direction T parallel to the axis X. They extend from adjacent an upper end 25 of said peripheral wall portion 23 in the direction of the body 2 of the container 1. The at least one opening is preferably elongated is said axial direction X of the body 2. The valve 6 as shown in for example FIG. 3 comprises a base element 26, which can be ring shaped, having an opening 27 extending through the base element 26 into the valve housing 24. A sealing ring or gasket 28 is positioned against a lower side of the base element 26, having an opening 27A axially coinciding with and directly below the opening 27. A valve body 29 loaded by a spring 30 is provided within the valve housing 24, resting on a bottom 31 of the valve housing 24. The valve body 29 is biased towards the base element 26, against the ring or gasket 28 and closing off the opening 27. The valve body 29 is operable through the opening 27 for opening a fluid connection between the inlet opening or openings 9 of the valve 6 and the opening 27 in the base element 26.

The valve 6 comprises in the embodiment shown in FIG. 3 and by way of example a substantially truncated cone shaped inner surface part 22, extending around the valve housing 24 of the valve 6, such that a first end 32 of the truncated cone shaped surface part 22, furthest from the body 2 of the container, is closer to the housing 24 of the valve 6 than the opposite second end 33. The at least one opening 9 extending into said valve housing 24 has the upper end 9A adjacent said first end 32 of the surface part 22. In embodiments wherein trapping of foam near the value is no issue or problem, this surface may be shaped differently.

The mounting ring 7 comprises a substantially cylindrical central portion 34, defining an insertion portion for the valve 6, as will be discussed. The central portion 34 is mainly formed by a peripheral wall 35 preferably extending around the axis X. From a lower end 47 of said wall 35 a substantially truncated conical closing wall 36 extends outward and sloping down outward. The closing wall has a peripheral edge 37 close to the inner wall of the neck 3 of the container 1. The edge 37 may be bent downward slightly, providing an inner curved or stepped surface portion 38. From the edge 37 a substantially cylindrical wall portion 39 extends upward to a stepping portion 40 transiting to an outward and upward flaring wall portion 41, which ends into an outwardly reaching peripheral flange 42 which can rest on and/or be connected to a free edge 3B of the container or, as shown in FIG. 3, to a free edge of an outer container 1B of the container 2, whereas the stepping portion 40 and/or a skirt 43 extending downward therefrom can be connected to an inner container 1A of the container 1. The ring 7 may close off a space 44 between the inner and outer container 1B, 1A.

In the embodiments shown the inner surface portion 21 of the mounting ring 7 extending between the edge 37 and the lower end 47 of the peripheral wall 35 slopes toward the end 47 at an angle α. The angle α can be defined as the angle between a surface Z perpendicular to the axis X and a straight line Y-Y extending through the edge 37 and the lower end 47 of the peripheral wall 35. In embodiments the angle α is preferably larger than about 15 degrees, more preferably at least 20 degrees. In embodiments the angle between a tangent to any point of the surface portion 21, extending through the axis x and the surface Z is nowhere along said surface portion 21 smaller than about 10 degrees, preferably not smaller than about 15 degrees, such as for example on average about 20 degrees. Preferably the angle is as small as possible, such that the overall height of the ring 7 and valve 6 is kept as small as allowable.

The valve comprises snap fingers 48 or a snap ring or cylinder extending from the base element 26, positioned around the opening 27 and the valve housing 24. A sealing ring 49 is provided around a portion 50 of the valve 6, between the snap fingers 48 and the base element 26. The sealing ring 49 can be provided as an integrally formed seal, for example by 2K injection moulding. The portion 50 has an outer cross section D1 only slightly smaller than the inner cross section D2 of an upper portion of the wall 35, whereas the base elements extends further outward, such that it can rest on an upper free edge 51 of the wall 35. On an inward facing side thereof, facing and surrounding the axis X, the mounting ring 7 comprises an opening defined by the wall 35 having axially opposite peripheral edges 47, 51. A first snap provision 52 is provided on the inward facing surface of the wall 35, facing inward and spaced apart from the edges 47, 51, for cooperating with a second, complementary snap provision 55 of the snap fingers 48 or snap ring of the valve 6 when pushed into the opening defined by the neck 3. To this end the snap fingers or snap ring 48 comprise at an outward facing side thereof at least a groove 55 (see also e.g. FIG. 8) of notches or openings for cooperation with the first snap provision 52. The snap ring or snap fingers 48 have ends 54 opposite the base element 26, which end or ends 54 may be rounded or stepped, such that when the valve 6 is snap fit in said opening, said rounded end or ends 54 form a smooth transition from the inward facing surface 21 of the ring 7 to the surface part 22 of the valve formed by said rounded end or ends 54. From the rounded ends 54 a further part of the inner surface portion 22 of the valve 6 extends at an angle β relative to the plane Z which is substantially larger than the angle α and can for example be larger than 45 degrees, for example at least 60 degrees, such as for example about 80 degrees or more.

As can be seen in FIG. 3 the end or ends 54 can be flushed with the inner surface 21 of the ring 7, such that foam will not be trapped at the transition between the inner surface 21 and the curved ends 54. The angles α and β are chosen such that foam will also not be trapped below these surfaces 21, 22. This will ensure that after broaching the container foam formed in the head space will be carried out of the container 1 with a first amount of beverage dispensed from the container 1. The cooperating first and second snapping provisions 52, 55 ensure that in normal use the valve 6 will be fixed inside the mounting ring 7, especially in axial direction X. The sealing ring 49 is compressed sealing off the valve 6 to the wall 35.

As discussed, for embodiments in which trapping of foam is no issue or no problem, the surface 18 may be formed differently, for example less smooth with other angles α and/or β and/or with grooves or the like.

Figure 8:
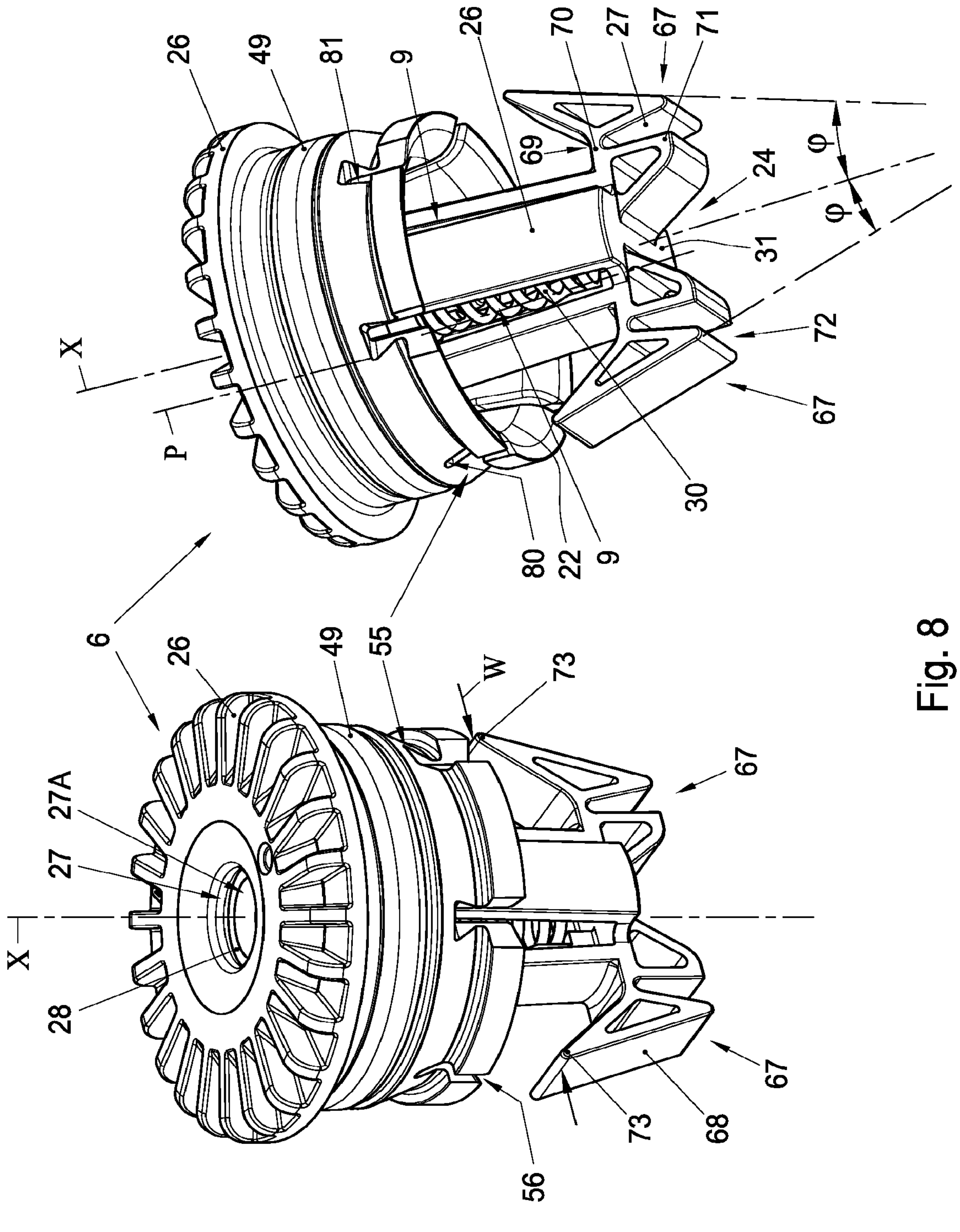
FIG. 8 schematically shows in two perspective views, an embodiment of a valve of the present invention.
Figure 12:
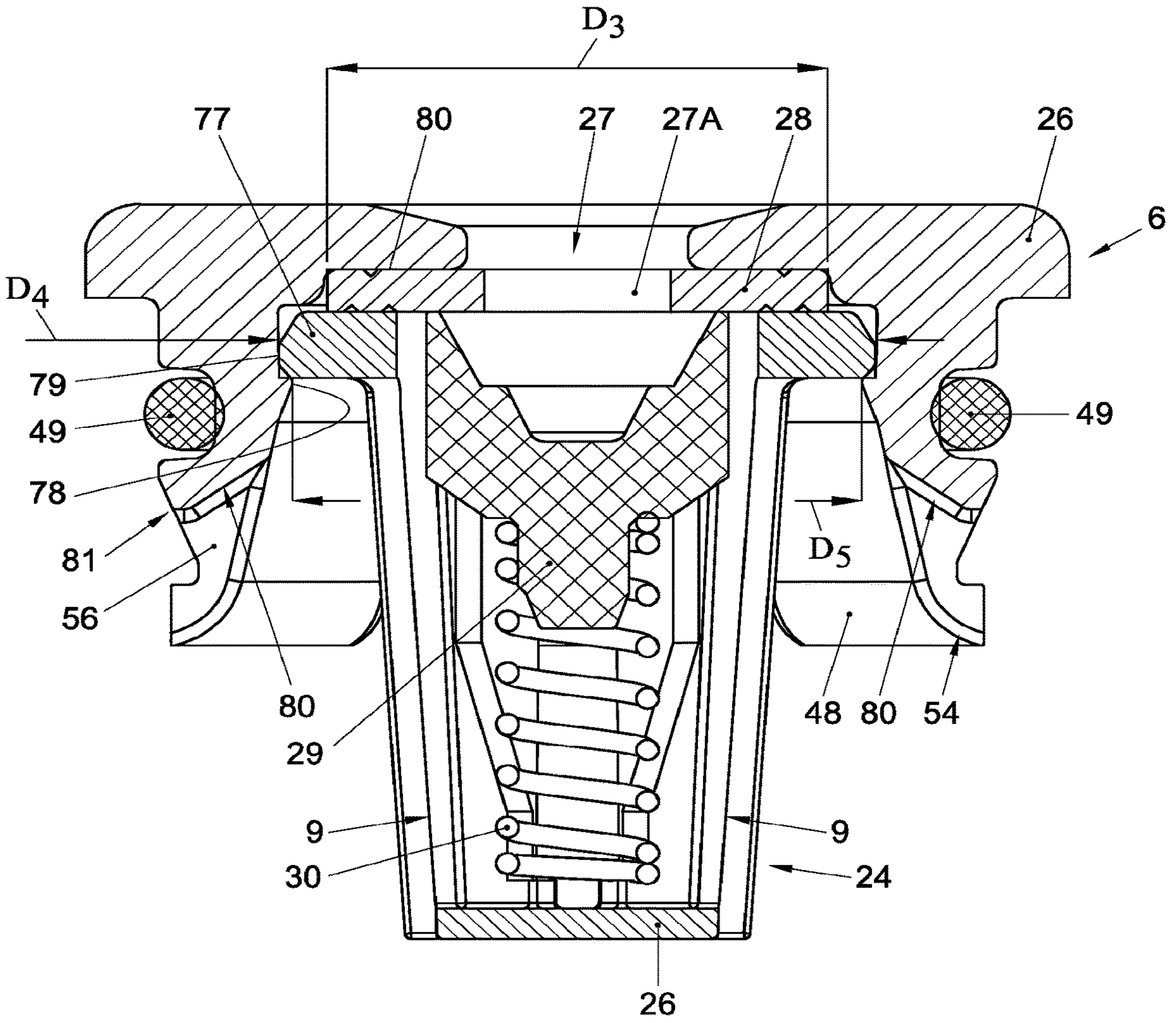
FIG. 12 schematically in cross section a valve according to the disclosure.

When using snap fingers 54 they may have spaces 56 between them for allowing the fingers 54 to deform for fitting the valve in the ring 7, as is e.g. shown in FIGS. 8 and 12. The spaces 56 can have a longitudinal direction P parallel to the axis X, with sloping and/or curved surface area 80 between the fingers at the upper end 81, such that foam cannot be trapped in these spaces 56.

In embodiments the valve 6 and the connecting ring 7 can be made of plastic materials. The spring can be made of metal but could also be replaced by a plastic spring or another resilient element biasing the valve body towards the position closing off the opening 27. Preferably the plastic material or materials are chosen such that they can be easily recycled together. Preferably the ring 7 is in embodiments made of a plastic material which can be welded to a plastic container, especially a container made of for example PET or PEN or blends thereof.

Figure 4:
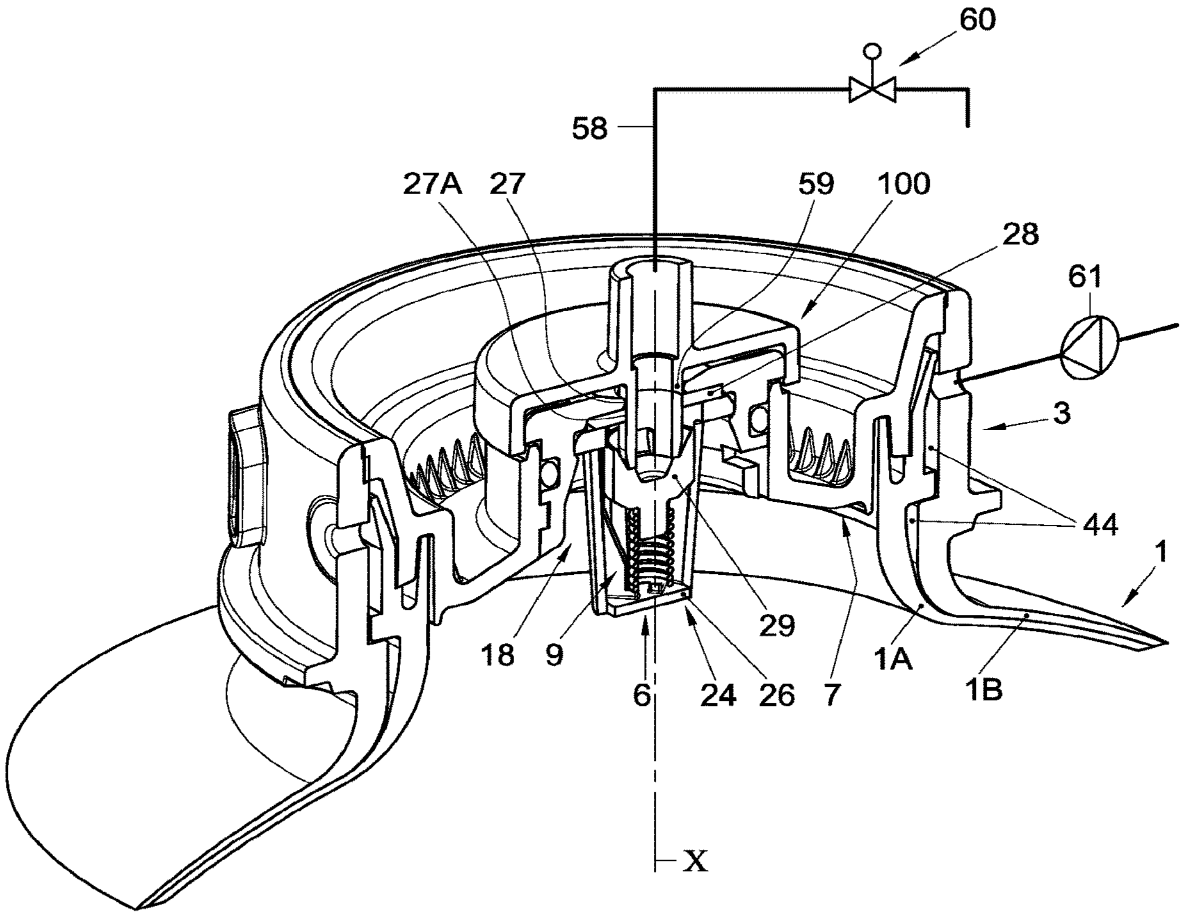
FIG. 4 schematically an embodiment of a top end of a container according to the disclosure, for example as shown in any one of the further figures, connected to a tapping device, schematically shown including a tap and pressurizing device.

In the neck 3 of the container 1 at least one opening 57 can be provided extending into the space 44 between the inner and outer container 1A, 1B of a BIC or BIB type container. The inner container 1A can be compressible, for example by forcing a pressure fluidum such as gas, for example air into the space 44. Thus the beverage inside the inner container 1B can be compressed. In FIG. 4 schematically a tapping line 58 is connected to the valve 6 by a dispense adapter 100 clicked or snapped over the base element 26. The dispense adapter 100 comprises a spout 59 which can extend through the opening 27 and sealingly through the opening 27A in the sealing ring 28 below it, for engaging the valve body 29 for forcing this away from the sealing ring 28 for opening the valve 6. Thus beverage can flow from the container through the valve 6 into the tapping line 58. The tapping line 58 is connected to or comprises a tap 60, which can be opened and closed for dispensing beverage in a known manner. A pump 61 or compressor or the like is connected to the at least one opening 57 for forcing air or another gas or fluid into the space 44 for compressing the inner container 1A and thus pressurizing the beverage. Such is for example disclosed in NL 2009234, NL 2009235, NL 2009236. A known pressure regulator (not shown) can be provided for regulating the pressure in the space 44.

The dispense adapter 100 may be disposable, for single use only as can the tapping line be.

In an alternative embodiment the container 1 as such can be compressed, for example in a pressure chamber, such that the container can be a single walled container 1. The content such as a beverage, for example such as beer can again be dispensed through the valve 6 and the dispense line 58 and tap 60. In a further alternative embodiment the valve 6 can be operated by a tap 61 directly mounted to the container, such that the valve can be opened and closed repeatedly for dispensing quantities of beverage. Such dispensing devices as such are well known in the art, from EP2291321 and EP 2282947.

Figure 5:
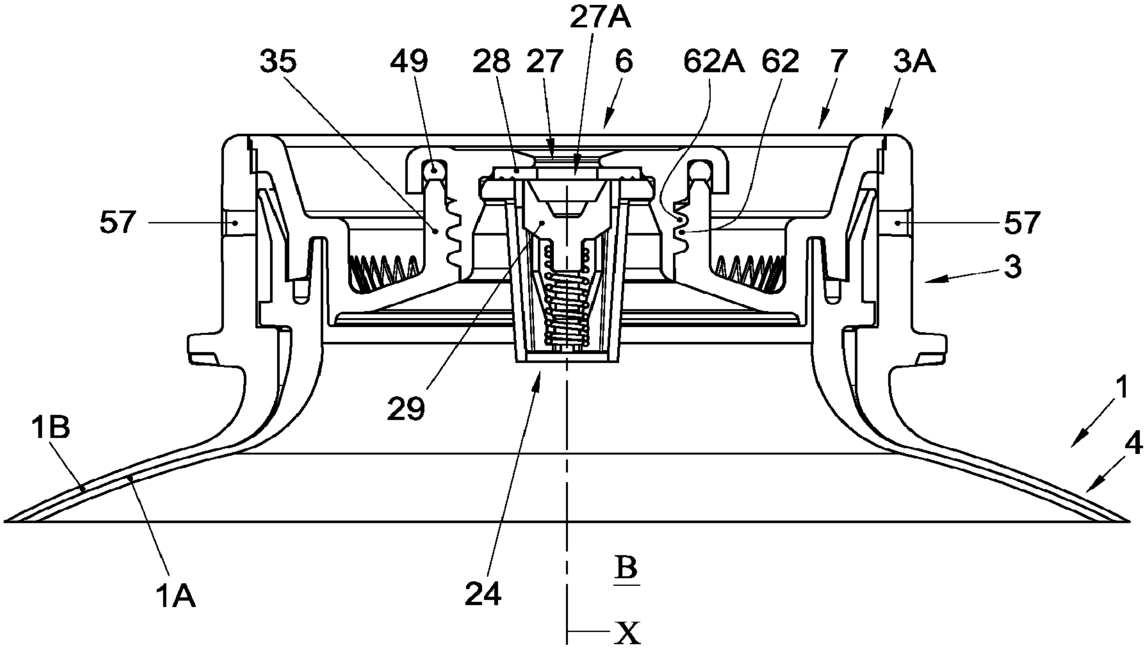
FIG. 5 schematically in cross section similar to FIG. 1 an alternative embodiment of part of a container according to the present invention, having an embodiment of a valve and valve assembly of the present disclosure.

FIG. 5 shows part of an embodiment of a container 1 similar to that as shown in FIG. 2-4, wherein however the valve 6 is mounted to the mounting ring 7 by means of screw threads 62 inside the wall 35, and complementary screw threads 62A on the valve 6. The sealing ring 49 is provided on top of the wall 35.

Figure 6:
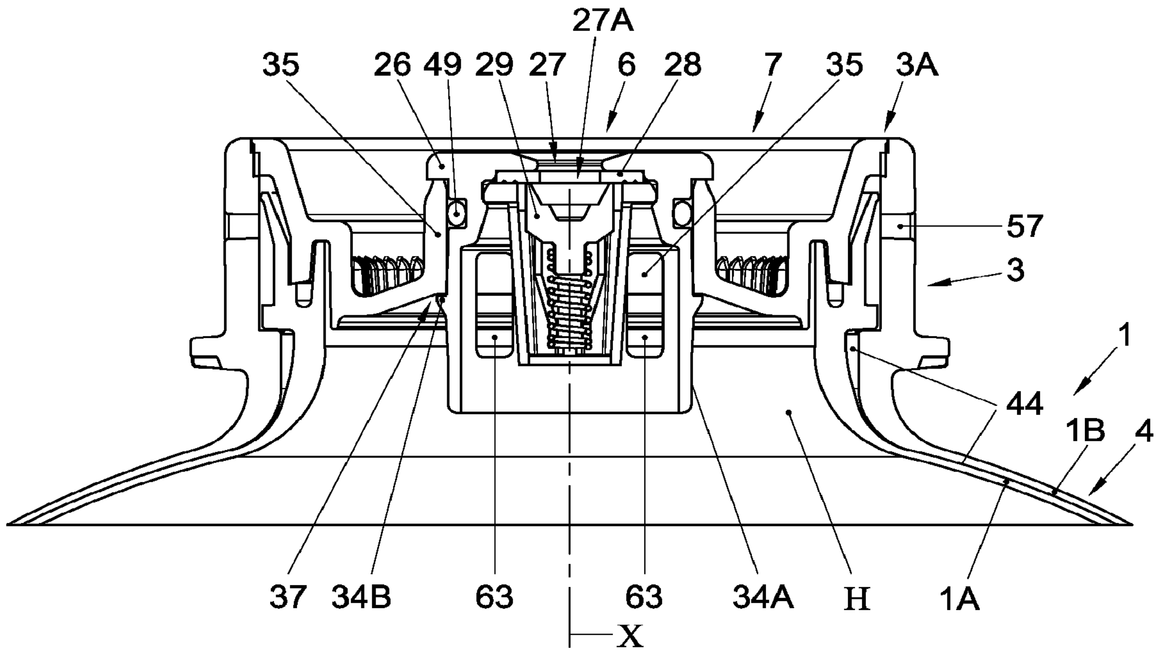
FIG. 6 schematically in cross section similar to FIG. 1 an alternative embodiment of part of a container according to the present invention, having an embodiment of a valve and valve assembly of the present disclosure.

FIG. 6 shows part of an embodiment of a container 1 similar to that as shown in FIG. 2-4, wherein however the valve 6 is provided with a cylindrical wall 34A instead of fingers 34, having relatively large openings 63 in it for allowing beverage and foam to pass. The wall 34A is provided with a snap ring or snap elements 34B on an outward facing side thereof, which can snap below the edge 37 for mounting it to the mounting ring 7. Due to the openings 63 extending axially on opposite sides of the elements 34B the cylindrical wall 34A is slightly deformable for press fitting or snapping the valve into its position within the ring 7.

FIG. 7 shows part of an embodiment of a container 1 similar to that as shown in FIG. 2-4, wherein however the valve 6 is mounted to the mounting ring 7 by means of screw threads 62 outside the wall 35, and complementary screw threads 62A on a skirt 65 of the valve 6. The sealing ring 49 is provided on top of the wall 35.

FIG. 8 shows a valve 6, similar to the embodiment of FIG. 2-4, schematically in two perspective views, comprising an additional safety feature 66 extending from the lower end of the valve especially from the valve housing 24. Without the safety feature 66 this FIG. can therefore also be descriptive for the other embodiments. Similarly the embodiments of FIG. 5-7 could be provided with such safety feature 66. The safety feature comprises a number of wings 67, for example two as shown extending in opposite directions, substantially perpendicular to the axis X, radially outward. As can also for example be seen in FIG. 11 the combined maximum width W of the wings 67 in rest is slightly wider that the cross section defined by the snap fingers or ring 48. The wings 66 in this embodiment are substantially triangular, with the base 68 extending at an acute angle φ relative to the axis X. The angle φ can for example be between 5 and 45 degrees. The top 69 of the triangular wing 67 is connected to the bottom 31 of the valve housing 24 by a living hinge 70. The bottom 31 of the housing is provided with a stop surface 71 extending downward spaced apart from a side 72 of the triangular wing 67. This allows the wing to pivot in two opposite directions around the hinge 70.

Figures 9A, 9B, 9C, 9D:
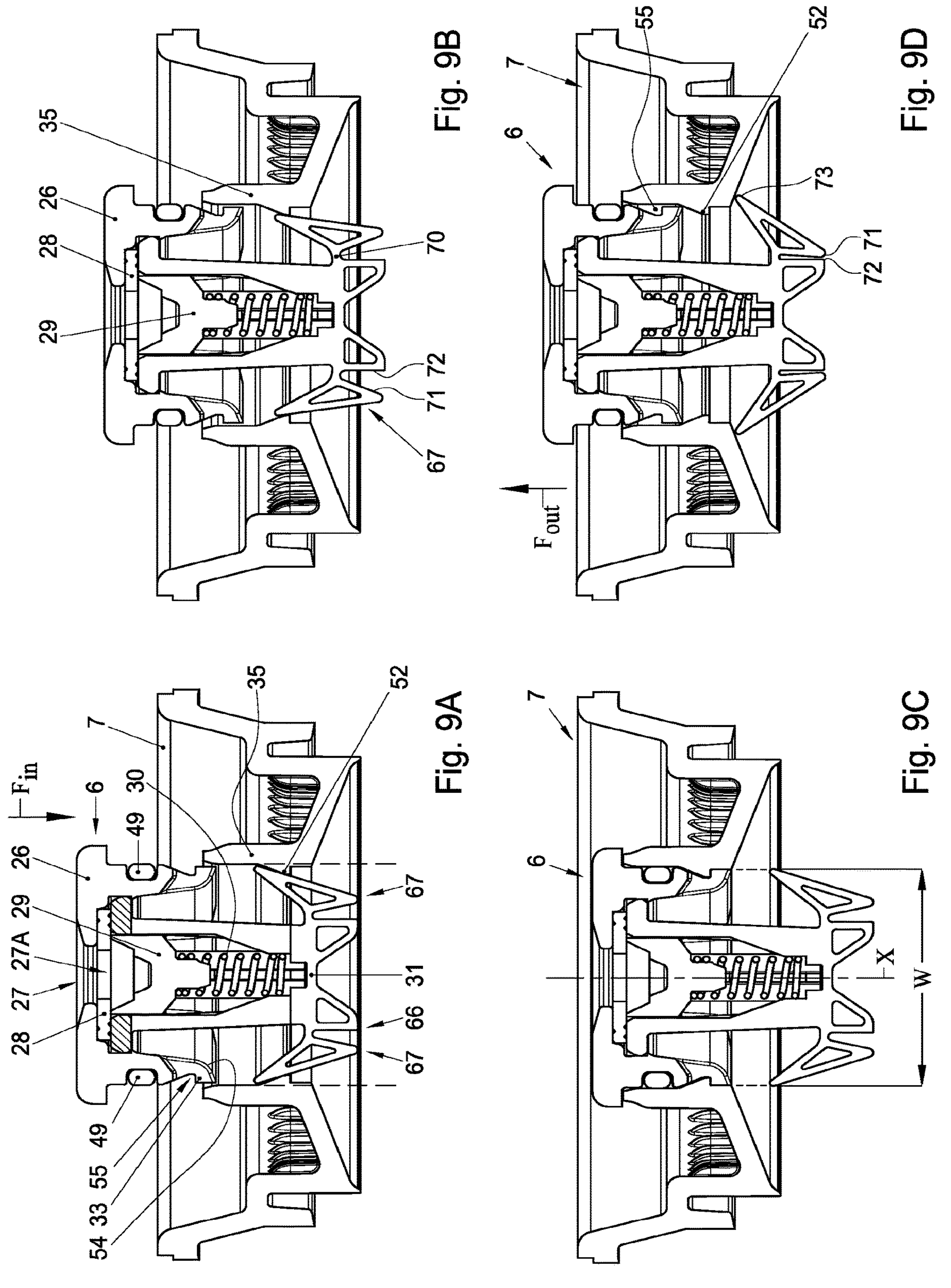
FIG. 9A-C schematically the placing of a valve according to the disclosure and, in FIG. 9D, the valve when pressed out partly, caught by a safety element.

FIG. 9A to 9C show mounting of the valve 6 into the mounting ring 7. In FIG. 9A the valve is inserted into the opening in the ring 7, with the safety feature 66 leading. As can be seen the trailing corners 73 of the wings 67 slide along the inner surface of the wall 35 up to the first snap provision 52. By pushing the valve further in the direction $F_{in}$, the wings 67 will be rotated around the hinge 70 in order to pass the snap provision 52, as shown in FIG. 9B. Then when the valve is pushed in even further the second snap provision 55 will engage over the first snap provision 52, thus fixing the valve 6 in position within the ring 7, as is shown in FIG. 9C. Such snapping for placing the valve is advantageous because it only requires a simple pushing of the valve in the direction $F_{in}$, whereas the valve 6 itself can be substantially rotational symmetrical, or at least the snap provisions 52, 55 can, which means that the valve does not need to be orientated before placing in a rotational direction around the axis X.

When properly placed as shown in FIG. 9C the safety feature 66, that is in this embodiment the wings 67 extend spaced below the surface 22, such as not to interfere with dispensing of the beverage and dispensing of any foam accumulated in the container. As can be seen the corners 73 are positioned below the surface 22. When for example the pressure inside the container would rise to above a safety pressure, for example because of excess heating, uncontrolled pressurizing or the like, the connection between the snap provisions 52, 55 may fail, pushing the valve back out of the ring 7, as shown in FIG. 9D, releasing the pressure. In order to prevent the valve from being shot out of the container uncontrollably the wings 67 of the safety feature 66 will be forced with the corners 73 against the inner surface area 22 of the ring and be pivoted outward, until the side 72 engages the stop surface 71, preventing further rotation. Thus the wings 67 will block the valve 6 from being pushed out further, as shown in FIG. 9D.

Figure 10:
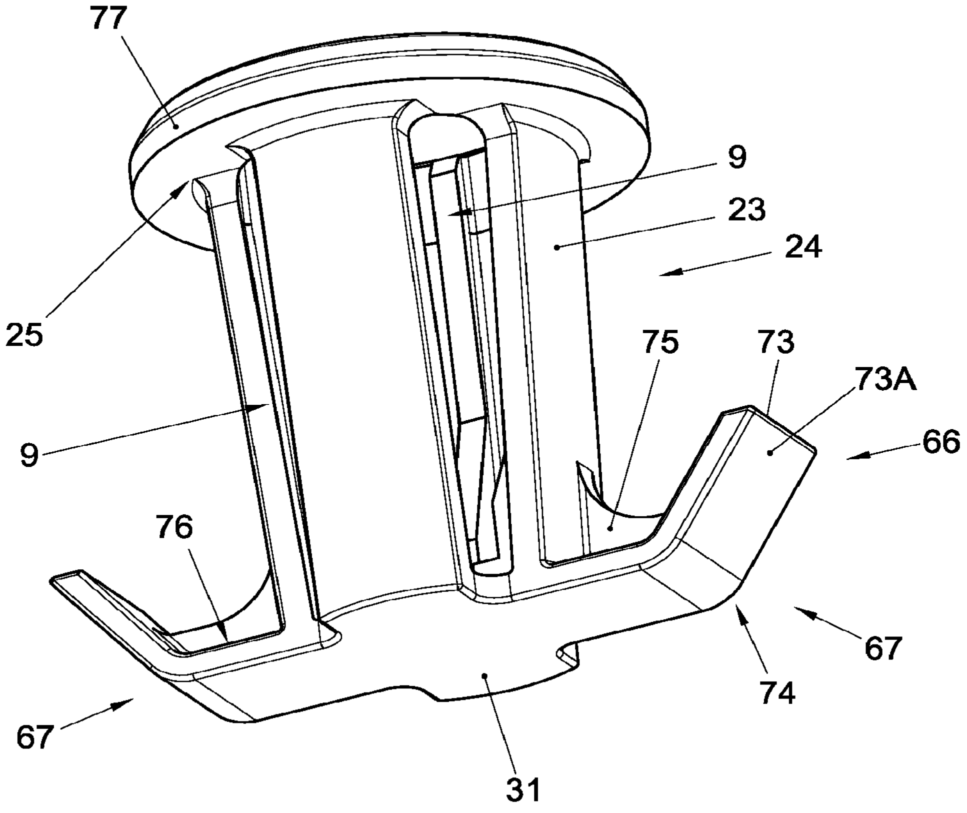
FIG. 10 schematically in perspective view a housing part of a valve, with an alternative safety element.
Figure 11:
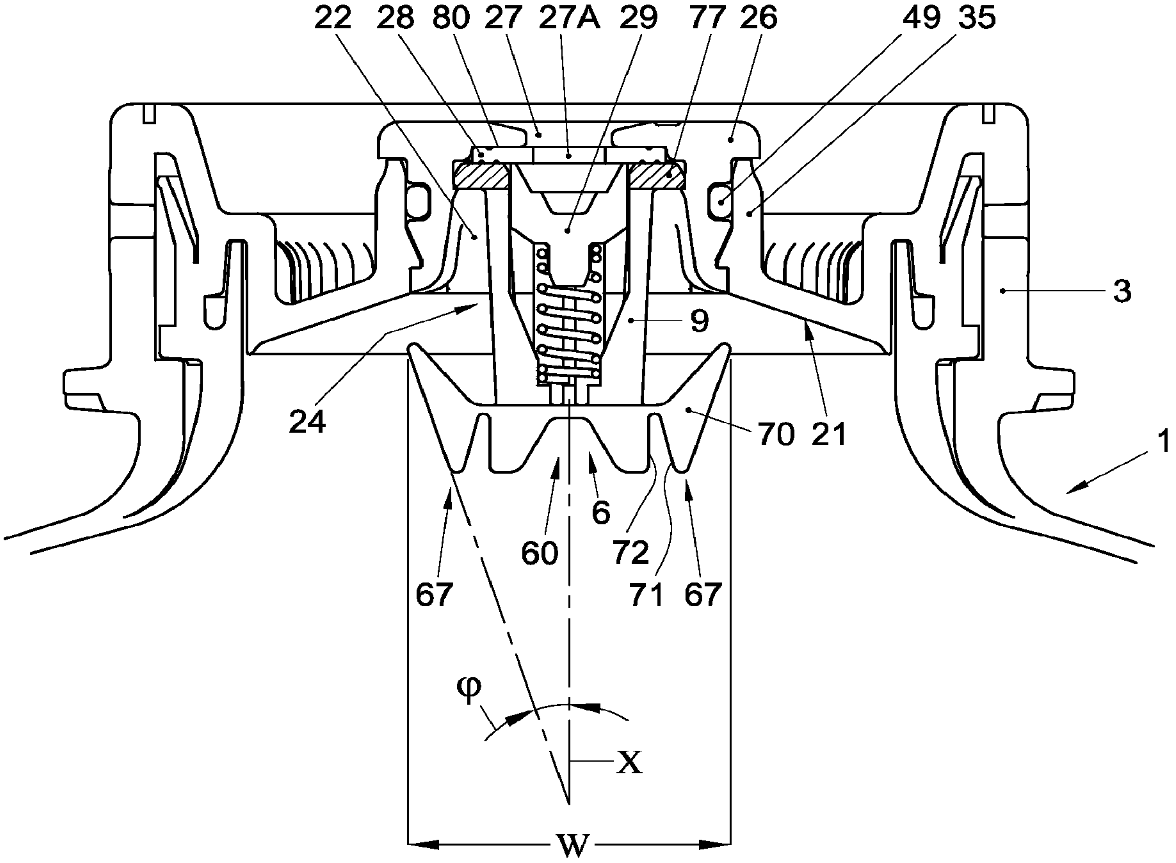
FIG. 11 schematically in cross section similar to FIG. 1 an embodiment of a part of a container with a valve assembly with safety element.

FIG. 10 schematically shows an alternative housing 24 of a valve 6 with an alternative safety feature 66. In this embodiment the wings 67 are formed by two angled strips 74 having tips 73A facing upwards. The strips 74 are enforced by ribs 75 on a top side 76. Again, when assembled into a valve 6, and when such valve 6 is pushed into the mounting ring, the wings will be deformed resiliently to pass through the opening in the mounting ring in order to extend, with the valve properly snapped into place, below the surface 22, such that when the valve 6 is pushed out again, the wings 67 will prevent the valve from moving all the way up and out of the mounting ring 7, but will allow the valve to release from the interconnecting snapping provisions 52, 55, in order to release excess pressure FIG. 11 shows in cross section schematically a valve assembly of FIGS. 8 and 9 mounted in a container, in this embodiment a BIC type container. As can be seen the mounting ring 7 has been welded to the container 1, in a manner as for example disclosed in applicants prior application EP 2291321, EP 2282947, NL 2009234, NL 2009236, NL 2009237 or EP 2448735 such that the space 44 is closed off, except for the opening or openings 57. This can be done for example after filling of the container but is preferably done prior to such filling. More preferably the mounting ring 7 is welded or otherwise mounted to a preform or preform assembly prior to blow moulding the container from such preform or preform set. The container can then be blow moulded by inserting a blow moulding tool such as a stretch and blow rod into the preform through said opening, for example in a filling line or just prior to entering the container into a filling line. The container can then be filled through the opening in the mounting ring 7, where after the valve 6 can be snapped into place easily. In the alternative embodiments of the valve 6 the valve can easily be screwed into place.

FIG. 12 shows at an enlarged scale in cross section a valve 6. As can be seen the valve housing 24 comprises at the upper end an outward reaching flange 77. The base element 26 is provided with a circular indentation or recess 80 into which the sealing ring 28 is fitted, having an outer diameter D3 slightly smaller than the outer diameter D4 of the flange 77. The surface area 22 is at an upper end provided with an inward facing edge 78, such that above the edge a groove 79 is provided. The edge 78 defines an opening having a diameter D5 slightly smaller than the diameter D4 of the flange 77. Thus when assembling the valve 6 the spring 30 and valve body 29 can be placed in the valve housing 24, and the sealing ring 28 can be placed in the recess 80 where after the valve housing 24 can be pushed into the base element 26, with the flange 77 facing forward, until the flange 77 is pushed passed the 78 and into the groove 79, thus simply snapping into place and fixing the valve housing 24 into the base element 26. In all of the embodiments shown such mounting of the valve housing can be used, though obviously also different constructions are possible for a valve 6 of a container of the present disclosure, as are for example known in the art.

Figure 13:
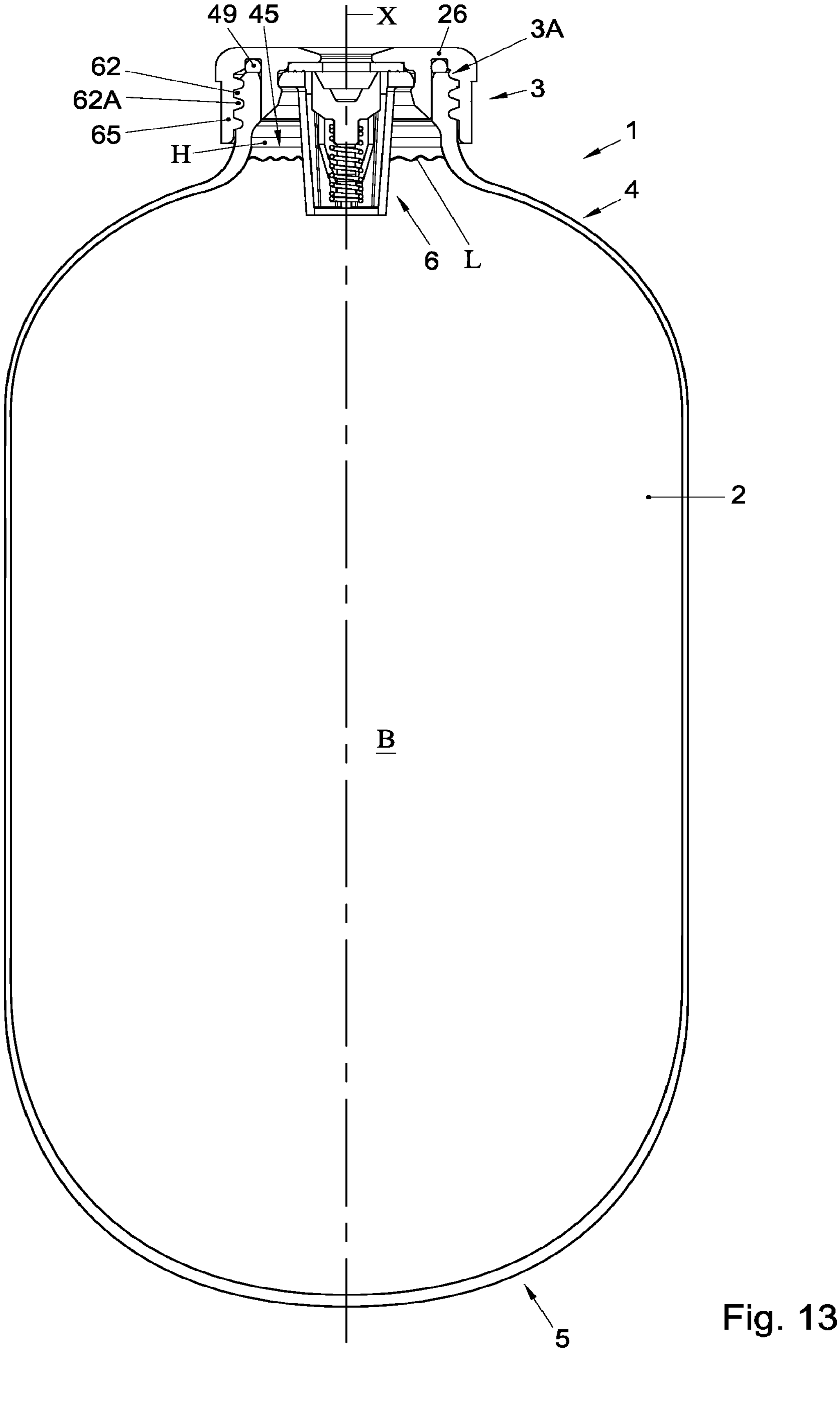
FIG. 13 schematically a container having a single wall, wherein a valve is mounted directly onto the neck of the container.

FIG. 13 shows a container 1 according to this disclosure, wherein a valve 6 is mounted directly onto the neck 3 of the container. By way of example only in this embodiment the valve 6 is shown comparable to that as shown in FIG. 7, wherein the neck 3 in stead of the wall 35 is provided with the external screw threads 62, whereas the valve is provided with the skirt or wall 65, with matching screw threads 62A. The valve 6 can be screwed onto the neck 3, closing off the container, wherein for example a sealing ring 49 can be mounted between the free edge or rim 3A of the neck 3 and the base element 26 of the valve 6. In this embodiment too the valve 6 is shown having a valve housing 24 snapped into place in the base element 26, for easy production. In general it can be said that it is likely that a container according to FIG. 13 can only have a limited maximum possible diameter of the body and a limited maximum possible length of the container between two axially opposite ends, because of the cross section of the neck onto which the valve is mounted, when compared to embodiments in which an extras mounting ring 7 is used, which generally allows for a larger cross section of the neck and hence of a bigger container, for example several liters instead of only about a maximum of for example about two to three liter. Alternatively a valve could be formed integrally with the mounting ring 7, which could then be placed onto a container integrally. In a further alternative other embodiments of a valve 6 as disclosed can be used in a container according to FIG. 13, when appropriate screw threads 62 are provided inside the neck (e.g. for a valve according to FIG. 5) or click provisions 52, 34A (e.g. for a valve according to FIG. 3 or 8)

FIG. 14 shows a container 1 which can for example be used lying on a side, the axis X extending substantially horizontal, wherein the valve 6 is provided at an end facing side ways. The valve 6 in this embodiment is again mounted in a mounting ring 7 mounted at the neck 3 of the container. In such embodiment, when properly filled with a beverage, there is no head space close to the valve and thus the issue as discussed of possible excess foaming will not occur. In this embodiment by way of example a riser pipe 99 is connected to the valve 6, especially to an inlet side thereof, in a known manner. Through the riser pipe a beverage can be dispensed, from a lower part of the container to and through the valve, when opened, and out, for example via a tap 60 as previously disclosed. In this embodiment for example a pressure gas can be inserted into the container 1, for example through an opening 98 in the mounting ring 7 or in the container in another position, for example provided by a pressure element such as a pump or high pressure gas cartridge and pressure reducer, as known in the art. Alternatively the container can be compressed for dispensing the beverage, in which can the riser pipe 99 may not be necessary. It should be clear that the container 1 can be placed in any suitable position for dispensing, for example also but not limited to a position in which the valve 6 is at a lower most end, the axis X extending substantially vertically. Again in such position there will be no head space adjacent the valve 6 and it is preferable to do without a riser pipe 99.

As can for example be seen in the cross sections of the different embodiments and in FIG. 8, the base element 26 can be provided at an upper side, that is the outward facing side when placed on the container, with a sloping surface area 27B around the opening 27, such that placement of the appropriate dispensed adapter or similar device for opening the valve is made more easy because it will up to a degree self-center.

In embodiments of a container without a mounting ring the container can be filled through the neck, prior to placing the valve 6, or through the valve 6 should this have been placed prior to filling. Filling prior to placing the valve 6 allows for easier and more rapid filling. In embodiments of a container 1 with a mounting ring 7 the container can be filled through the opening into which the valve 6 is to be mounted, prior to placing the valve 6, or through the valve 6 should this have been placed prior to filling. Filling prior to placing the valve 6 allows for easier and more rapid filling.

In the embodiments with a mounting ring 7 the mounting ring can be, but not necessarily is, as disclosed and discussed in for example NL 2009234, NL 2009236, NL 2009237 or EP 2448735, as far as not related to the mounting of the valve 6, and can be used in the same or a similar way, including but not limited to the mounting to the or each container by spin welding and filling of the container prior to mounting the valve in the mounting ring.

In embodiments, especially of BIC or BIB type containers, an inner container can be connected to the valve prior to mounting the valve to the mounting ring or to the container or to the mounting ring prior to mounting the mounting ring to the container.

In the embodiments discussed here above the container, especially an inner container 1A is discussed having been made of plastic. Obviously, the container or, if applicable the inner container, should be made of a compressible or pliable material if the container should be compressed for dispensing the beverage. An outer container 1B of a BIC or BIB type container may also be made of plastic but could alternatively be made of another material, such as for example but not limited to metal.

In the embodiments shown the valve 6 and especially the valve body 29 is designed as a female valve or valve body 29, meaning that the valve body 29 extends all below the surface of the base element and for opening the valve an operating element such as the dispense adapter as discussed has to be inserted through the opening 27. Alternatively the valve 6 can be designed as a male type valve or as a tilting type valve as known in the art of for example aerosol valves as alternatives to a female type valve.

In the embodiments shown the valve 6 is mounted in a mounting ring 7 mounted to a neck of a container 1. Alternatively the valve 6 could be snapped into a neck of a container directly, by providing the first snap provision 52 directly on the inner surface of the neck.

In the embodiments shown the neck of the container is provided with at least one opening 57 opening into the space 44, for example in a way and for the purpose of as extensively discussed in for example NL 2009234, NL 2009236, NL 2009237 or EP 2448735. As discussed alternative embodiments of a container 1 could be single walled and compressible by an outside medium of mechanical means, such as for example disclosed in applicants application EP 2448858 or WO2007/019853. Moreover, in a BIC or BIB type container according to the present disclosure one or more openings 57 opening into the space 44 could be provided in different positions and in different manners, such as for example through the mounting ring 7. Moreover such at least one opening 57 could be provided with a valve, especially a non-return valve, in order to maintain a pressure in the space 44, even if the source of pressure is removed or switched off. This can prevent the container 1 or inner container 1A from expanding again, reducing the pressure inside the container and thus possibly allowing gas to be released from the beverage forming a gas and/or foam filled head space again.

In this disclosure directly open of an inlet side of the valve to the inner space of the container should be understood as meaning that the valve housing comprises at least one and preferably several openings which open to radially outward facing sides of the housing. If such opening or openings are present also a, preferably short, riser pipe could be provided. Preferably no riser pipe is connected to the valve.

In the embodiments shown the spring 31 in the valve 6 is shown as a spiral spring, which can be made of metal or plastic. Alternatively or additionally other elements can be provided for biasing the valve body 29 towards and against the sealing ring 28, such as but not limited to a resilient body such as foam, especially closed cell foam, or a piston-cylinder system.

Though a container, valve and valve assembly of this disclosure are preferably used for dispensing beer or similar carbonated beverages, especially beverages which may be dispensed forming a foam head in a receptacle such as a glass or pitcher, other beverages or substances might also be used. A valve and valve assembly as disclosed could also be used with other inner surface areas and in different containers, wth the same or similar advantages and effects.

The invention is by no means limited to the embodiments specifically disclosed and/or discussed. Many variations and alterations, as well as combinations of features of the embodiments shown and/or discussed are possible within the scope of the present disclosure. These should also be considered as having been disclosed herein.

The invention claimed is:

1. A method of forming a container comprising a body and a neck, wherein— a mounting ring is mounted at the neck, which mounting ring comprises an opening having at least a first snap provision, wherein a valve is pressed into said opening, which valve is snap-fit into the opening by a second snap provision provided on the valve, cooperating with the first snap provision; or the neck defines an opening having at least a first snap provision, wherein a valve is pressed into said opening, which valve is snap-fit into the opening by a second snap provision provided on the valve, cooperating with the first snap provision, wherein the valve is provided for dispensing a beverage containing a gas from the container, wherein an inner surface part of the container adjacent the valve, especially an inner surface part of the container within the neck between the body and an inlet side of the valve is smooth and sloping towards the inlet side of the valve, such that foam is prevented from being trapped at the inner surface of the neck.

2. The method of forming the container according to claim 1, wherein the valve is mounted in the mounting ring, which mounting ring is mounted to the neck.

3. The method of forming the container according to claim 1, wherein the second snap provision provided on the valve includes snap fingers or a snap ring of the valve.

4. The method of forming the container according to claim 3, wherein the snap ring or snap fingers have ends opposite a base element, which end or ends are rounded, such that when the valve is snap fit in said opening, said rounded end or ends form a smooth transition from an inward facing surface of the mounting ring and a surface part of the valve formed by said rounded end or ends.

5. The method of forming the container according to claim 1, wherein the said surface part is sloping towards an end of the inlet side of the valve opposite the body.

6. The method of forming the container according to claim 1, wherein the body is provided with a stand support opposite the neck, and wherein an inlet side of the valve is open towards an inner volume of the container, without a riser pipe.

7. The method of forming the container according to claim 1, wherein the container is filled with a beverage comprising gas, especially a carbonated beverage.

8. The method of forming the container according to claim 1, wherein the container is compressible for pressurizing beverage in the container by reducing an inner volume of the container, wherein the container can be an inner container of a BIC or BIB type container.

9. The method of forming the container according to claim 1, wherein the valve is mounted in the neck or in the mounting ring provided at the neck of the container, wherein the valve is mounted by a snap-fit in the opening in the neck or mounting ring.

10. A method of forming a container comprising a body and a neck, wherein a mounting ring is mounted at the neck, which mounting ring comprises an opening having at least a first snap provision, wherein a valve is pressed into said opening, which valve is snap-fit into the opening by a second snap provision provided on the valve, cooperating with the first snap provision; or the neck defines an opening having at least a first snap provision, wherein a valve is pressed into said opening, which valve is snap-fit into the opening by a second snap provision provided on the valve, cooperating with the first snap provision, wherein the valve is mounted in a closure ring, which closure ring is mounted to the neck, wherein the valve comprises a peripheral wall portion with at least one opening forming an inlet of an inlet side of the valve, wherein the at least one opening is preferably elongated is said direction of the body.

11. A method of forming a container comprising a body and a neck, wherein a mounting ring is mounted at the neck, which mounting ring comprises an opening having at least a first snap provision, wherein a valve is pressed into said opening, which valve is snap-fit into the opening by a second snap provision provided on the valve, cooperating with the first snap provision; or the neck defines an opening having at least a first snap provision, wherein a valve is pressed into said opening, which valve is snap-fit into the opening by a second snap provision provided on the valve, cooperating with the first snap provision, wherein the valve comprises a substantially truncated cone shaped inner surface part, extending around a valve housing of the valve, such that a first end of the truncated cone shaped surface part, furthest from the body, is closer to the housing of the valve than the opposite second end, whereas an inlet side of the valve comprises at least one opening extending through said housing.

12. A method of forming a container comprising a body and a neck, wherein a mounting ring is mounted at the neck, which mounting ring comprises an opening having at least a first snap provision, wherein a valve is pressed into said opening, which valve is snap-fit into the opening by a second snap provision provided on the valve, cooperating with the first snap provision; or the neck defines an opening having at least a first snap provision, wherein a valve is pressed into said opening, which valve is snap-fit into the opening by a second snap provision provided on the valve, cooperating with the first snap provision, wherein the valve comprises a snap ring or snap skirt, comprising a series of resilient snap fingers, which snap fingers preferably have or define a free edge, rounded such that said edge forms a substantially smooth transition to the or a further inner surface part when the valve is snap fit into a mounting opening of the neck or of a mounting ring mounted at the neck, wherein more preferably at said transition no crevice is present having a width larger than about 0.2 mm.

13. The method of forming the container according to claim 12, wherein the fingers are connected to a base element of the valve at an end opposite the free end, wherein between adjacent fingers a gap can exist, having an end at the side of the base element sloping towards an inlet side of the valve.

14. A method of forming a container comprising a body and a neck, wherein a mounting ring is mounted at the neck, which mounting ring comprises an opening having at least a first snap provision, wherein a valve is pressed into said opening, which valve is snap-fit into the opening by a second snap provision provided on the valve, cooperating with the first snap provision; or the neck defines an opening having at least a first snap provision, wherein a valve is pressed into said opening, which valve is snap-fit into the opening by a second snap provision provided on the valve, cooperating with the first snap provision, wherein the valve comprises a base element and snap fingers extending therefrom, positioned around an opening through the base element, wherein between the fingers a valve housing is provided, having at least one inlet opening and a spring loaded valve body, biased towards the base element and closing off the opening, wherein the valve body is operable through the opening for opening a fluid connection between the inlet opening or openings and the opening in the base element, wherein preferably the valve housing is snap fit into the base element.

15. A method of forming a container comprising a body and a neck, wherein a mounting ring is mounted at the neck, which mounting ring comprises an opening having at least a first snap provision, wherein a valve is pressed into said opening, which valve is snap-fit into the opening by a second snap provision provided on the valve, cooperating with the first snap provision; or the neck defines an opening having at least a first snap provision, wherein a valve is pressed into said opening, which valve is snap-fit into the opening by a second snap provision provided on the valve, cooperating with the first snap provision, wherein the valve is provided with a safety element in the container, catching the valve when being expelled by pressure in the container.

* * * * *